United States Patent
Simon et al.

(10) Patent No.: US 12,259,724 B2
(45) Date of Patent: Mar. 25, 2025

(54) ADAPTIVE ACCELERATION FOR MATERIALS HANDLING VEHICLE

(71) Applicant: Crown Equipment Corporation, New Bremen, OH (US)

(72) Inventors: Andreas Simon, Munich (DE); Sebastian Theos, Vaterstetten (DE); Johannes Nachtigal, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 74 days.

(21) Appl. No.: 16/943,567

(22) Filed: Jul. 30, 2020

(65) Prior Publication Data

US 2021/0064026 A1 Mar. 4, 2021

Related U.S. Application Data

(60) Provisional application No. 62/991,206, filed on Mar. 18, 2020, provisional application No. 62/991,217, (Continued)

(51) Int. Cl.
*G05D 1/00* (2024.01)
*B66F 9/075* (2006.01)

(52) U.S. Cl.
CPC ......... *G05D 1/0061* (2013.01); *B66F 9/0755* (2013.01); *B66F 9/07581* (2013.01); *G05D 1/0066* (2013.01)

(58) Field of Classification Search
CPC ............... G05D 1/0061; G05D 1/0066; G05D 2201/0216; G05D 1/0033; B66F 9/0755; B66F 9/07581; B66F 9/24
See application file for complete search history.

(56) References Cited

U.S. PATENT DOCUMENTS

| 4,768,636 A | 9/1988 | Ito et al. |
| 4,942,529 A | 7/1990 | Avitan et al. |

(Continued)

FOREIGN PATENT DOCUMENTS

| CN | 101405176 A | 4/2009 |
| CN | 104067031 A | 9/2014 |

(Continued)

OTHER PUBLICATIONS

English Translation of CN-107063239-A.*
(Continued)

*Primary Examiner* — Jess Whittington
*Assistant Examiner* — Shahira Baajour
(74) *Attorney, Agent, or Firm* — Stevens & Showalter LLP

(57) ABSTRACT

A method for operating a materials handling vehicle is provided comprising: monitoring, by a controller, a first vehicle drive parameter corresponding to a first direction of travel of the vehicle during a first manual operation of the vehicle by an operator and concurrently monitoring, by the controller, a second vehicle drive parameter corresponding to a second direction different from the first direction of travel during the first manual operation of the vehicle by an operator. The controller receives, after the first manual operation of the vehicle, a request to implement a first semi-automated driving operation. Based on the first and second monitored vehicle drive parameters during the first manual operation, the controller controls implementation of the first semi-automated driving operation.

11 Claims, 6 Drawing Sheets

Related U.S. Application Data filed on Mar. 18, 2020, provisional application No. 62/892,213, filed on Aug. 27, 2019.

(56) References Cited

U.S. PATENT DOCUMENTS

| | | |
|---|---|---|
| 5,357,435 A | 10/1994 | Yasuda |
| 6,282,482 B1 | 8/2001 | Hedström |
| 7,017,689 B2 | 3/2006 | Gilliland et al. |
| 7,233,861 B2 | 6/2007 | Van Buer et al. |
| 7,240,757 B2 | 7/2007 | Ueda et al. |
| 7,302,338 B2 | 11/2007 | Petzold et al. |
| 7,475,753 B2 | 1/2009 | Oka et al. |
| 7,524,268 B2 | 4/2009 | Oka et al. |
| 7,568,547 B2 | 8/2009 | Yamada et al. |
| 7,693,641 B2 | 4/2010 | Maruki |
| 8,072,309 B2 | 12/2011 | Kraimer et al. |
| 8,392,049 B2 | 3/2013 | Goodwin et al. |
| 8,412,431 B2 | 4/2013 | Wetterer et al. |
| 8,589,012 B2 | 11/2013 | Wong et al. |
| 8,634,980 B1 | 1/2014 | Urmson et al. |
| 8,731,786 B2 | 5/2014 | Tueshaus |
| 8,751,095 B2 | 6/2014 | Goodwin et al. |
| 8,886,378 B2 | 11/2014 | Hammer et al. |
| 8,965,621 B1 | 2/2015 | Urmson et al. |
| 9,082,293 B2 | 7/2015 | Wellman et al. |
| 9,189,897 B1 | 11/2015 | Stenneth |
| 9,358,975 B1 | 6/2016 | Watts |
| 9,547,945 B2 | 1/2017 | Mccabe et al. |
| 9,561,794 B2 | 2/2017 | Watts |
| 9,561,941 B1 | 2/2017 | Watts |
| 9,573,597 B2 | 2/2017 | Uno |
| 9,645,968 B2 | 5/2017 | Elston et al. |
| 9,650,233 B2 | 5/2017 | Medwin et al. |
| 9,718,661 B1 | 8/2017 | Hoffman |
| 9,779,059 B2 | 10/2017 | Kammerer et al. |
| 9,870,002 B1 | 1/2018 | Holmberg et al. |
| 10,119,272 B1* | 11/2018 | Shah ................ B66F 9/063 |
| 10,209,682 B1 | 2/2019 | Hebert et al. |
| 10,336,150 B1 | 7/2019 | Hebert et al. |
| 10,459,449 B2 | 10/2019 | Watts |
| 10,795,364 B1 | 10/2020 | Abeloe |
| 11,086,544 B2 | 8/2021 | Yun et al. |
| 11,126,178 B2 | 9/2021 | Akella et al. |
| 11,167,967 B2 | 11/2021 | Hoffman |
| 11,827,505 B2 | 11/2023 | Tamanna et al. |
| 2009/0132088 A1 | 5/2009 | Taitler |
| 2010/0198513 A1* | 8/2010 | Zeng ................ G01S 17/89 701/300 |
| 2010/0204891 A1 | 8/2010 | Biggerstaff |
| 2011/0046813 A1 | 2/2011 | Castaneda et al. |
| 2011/0106362 A1 | 5/2011 | Seitz |
| 2011/0137544 A1* | 6/2011 | Kawazu ................ F02N 15/06 701/113 |
| 2012/0123614 A1 | 5/2012 | Laws et al. |
| 2012/0277965 A1 | 11/2012 | Takahashi et al. |
| 2012/0310473 A1 | 12/2012 | Yoshii |
| 2013/0197715 A1* | 8/2013 | Otanez ................ B60W 50/082 701/1 |
| 2013/0197760 A1 | 8/2013 | Castaneda et al. |
| 2014/0305211 A1 | 10/2014 | Malvern et al. |
| 2015/0094928 A1 | 4/2015 | Matsumura |
| 2015/0149017 A1 | 5/2015 | Attard et al. |
| 2015/0149104 A1 | 5/2015 | Baker et al. |
| 2015/0166069 A1 | 6/2015 | Engelman et al. |
| 2015/0364021 A1 | 12/2015 | Ur |
| 2016/0023675 A1 | 1/2016 | Hannah et al. |
| 2016/0075339 A1 | 3/2016 | Versteyhe et al. |
| 2016/0078694 A1 | 3/2016 | Swift |
| 2016/0314428 A1 | 10/2016 | Sugaya |
| 2017/0123423 A1 | 5/2017 | Sako et al. |
| 2017/0174221 A1* | 6/2017 | Vaughn ................ G05D 1/0221 |
| 2017/0212526 A1 | 7/2017 | Vanderpool et al. |
| 2017/0248965 A1 | 8/2017 | Wellman et al. |
| 2018/0002894 A1 | 1/2018 | Yamamoto et al. |
| 2018/0009643 A1 | 1/2018 | Hoffman |
| 2018/0113465 A1* | 4/2018 | Buss ................ B60W 10/20 |
| 2018/0118219 A1 | 5/2018 | Hiei et al. |
| 2018/0157036 A1* | 6/2018 | Choi ................ G06T 19/006 |
| 2018/0229988 A1 | 8/2018 | Gault et al. |
| 2018/0327184 A1 | 11/2018 | Sibley |
| 2018/0345984 A1* | 12/2018 | Lindelöf ................ G07C 5/0808 |
| 2018/0370780 A1 | 12/2018 | Marsee |
| 2019/0011918 A1* | 1/2019 | Son ................ G01C 21/3617 |
| 2019/0056736 A1 | 2/2019 | Wood et al. |
| 2019/0137991 A1 | 5/2019 | Agarwal |
| 2019/0145860 A1 | 5/2019 | Phillips et al. |
| 2019/0184556 A1 | 6/2019 | Sinyavskiy et al. |
| 2019/0226178 A1 | 7/2019 | Nakano et al. |
| 2019/0263447 A1 | 8/2019 | Nakano et al. |
| 2019/0279493 A1 | 9/2019 | Kim et al. |
| 2019/0294175 A1 | 9/2019 | Pajevic et al. |
| 2019/0302794 A1 | 10/2019 | Kean et al. |
| 2019/0346862 A1 | 11/2019 | Switkes et al. |
| 2020/0012290 A1 | 1/2020 | Watts |
| 2020/0089241 A1 | 3/2020 | Kao et al. |
| 2020/0198699 A1 | 6/2020 | Lee |
| 2020/0394562 A1 | 12/2020 | Nonaka et al. |
| 2020/0409383 A1 | 12/2020 | Maunder |
| 2021/0087033 A1 | 3/2021 | Kimura et al. |
| 2021/0103278 A1 | 4/2021 | Yu et al. |
| 2022/0363528 A1 | 11/2022 | Okamoto et al. |

FOREIGN PATENT DOCUMENTS

| | | | |
|---|---|---|---|
| CN | 104755339 A | 7/2015 | |
| CN | 104915813 A | 9/2015 | |
| CN | 105060177 A | 11/2015 | |
| CN | 105735166 A | 7/2016 | |
| CN | 106061817 A | 10/2016 | |
| CN | 205740199 U | 11/2016 | |
| CN | 107063239 A * | 8/2017 | ............ G01C 21/14 |
| CN | 108216190 A | 6/2018 | |
| CN | 109808703 A | 5/2019 | |
| CN | 109911816 A | 6/2019 | |
| CN | 109991982 A | 7/2019 | |
| DE | 102014118079 A1 | 6/2015 | |
| DE | 102015113445 A1 | 1/2017 | |
| EP | 1770052 A2 | 4/2007 | |
| EP | 1770053 A2 | 4/2007 | |
| EP | 1770054 A2 | 4/2007 | |
| EP | 1985576 A2 | 10/2008 | |
| EP | 2279148 A2 | 2/2011 | |
| EP | 2741268 A1 | 6/2014 | |
| EP | 2886507 A1 | 6/2014 | |
| EP | 2848484 A2 | 3/2015 | |
| EP | 2860077 A2 | 4/2015 | |
| EP | 3098194 A1 | 11/2016 | |
| EP | 3118152 A1 | 1/2017 | |
| EP | 3132682 A1 | 2/2017 | |
| EP | 3498556 A1 | 6/2019 | |
| EP | 3647136 A1 | 5/2020 | |
| JP | H01261200 A | 10/1989 | |
| JP | 05180030 A | 7/1993 | |
| JP | H07187323 A | 7/1995 | |
| JP | H09218136 A | 8/1997 | |
| JP | 2004352455 A | 12/2004 | |
| WO | 2009129295 A2 | 10/2009 | |
| WO | 2011002478 A2 | 1/2011 | |
| WO | 2011059421 A1 | 5/2011 | |
| WO | 2015166811 A1 | 11/2015 | |
| WO | 2017105755 A1 | 6/2017 | |
| WO | 2018048641 A1 | 3/2018 | |
| WO | 2019183580 A1 | 9/2019 | |

OTHER PUBLICATIONS

International Preliminary Report on Patentability dated May 9, 2022; International Application No. PCT/US2021/022279; European Patent Office; Rijswijk, Netherlands.

Kohlmeyer, Rolf R. Article Dated Nov. 2011 Entitled "Modelling and Control of an Articulated Underground Mining Vehicle"; University of Pretoria; Pretoria, S. Africa.

(56) References Cited

OTHER PUBLICATIONS

International Search Report and Written Opinion of the International Searching Authority dated Jul. 12, 2021; International Application No. PCT/US2021/022281; European Patent Office; Rijswijk, Netherlands.
International Search Report and Written Opinion of the International Searching Authority dated Jun. 1, 2021; International Application No. PCT/US2021/022279; European Patent Office; Rijswijk, Netherlands.
U.S. Patent Application Dated Jul. 20, 2021 Entitled "Adaptive Acceleration for Materials Handling Vehicle"; U.S. Appl. No. 17/443,044; United States Patent and Trademark Office; Alexandria, Virginia.
U.S. Patent Application Dated Mar. 15, 2021 Entitled "Adaptive Acceleration for Materials Handling Vehicle"; U.S. Appl. No. 17/249,798; United States Patent and Trademark Office; Alexandria, Virginia.
U.S. Patent Application Dated Mar. 15, 2021 Entitled "Based on Detected Start of Picking Operation, Resetting Stored Data Related to Monitored Drive Parameter"; U.S. Appl. No. 17/249,799; United States Patent and Trademark Office; Alexandria, Virginia.
International Search Report and Written Opinion of the International Searching Authority dated Nov. 12, 2020; International Application No. PCT/US2020/044262; European Patent Office; Rijswijk, Netherlands.
Al-Shihabi, Talal article dated Jan. 1, 2003; "Toward More Realistic Driving Behavior Models for Autonomous Vehicles in Driving Simulators"; Transportation Research Record: Journal of the Transportation Research Board; vol. 1843; Issue 1; pp. 41-49.
Calabrese, Marco et al. article dated Sep. 2008; "Experimental System to Support Real-Time Driving Pattern Recognition"; Advanced Intelligent Computing Theories and Applications. With Aspects of Artificial Intelligence; pp. 1192-1199.
International Search Report and Written Opinion of the International Searching Authority dated Oct. 20, 2021; International Application No. PCT/US2021/042306; European Patent Office; Rijswijk, Netherlands.
Written Opinion of the International Preliminary Examining Authority dated Feb. 14, 2022; International Application No. PCT/US2021/022279; European Patent Office; Munich, Germany.
International Preliminary Report on Patentability dated Mar. 1, 2022; International Application No. PCT/US2020/044262; The International Bureau of WIPO; Geneva, Switzerland.
Office Action dated Sep. 14, 2022; U.S. Appl. No. 17/249,798; United States Patent and Trademark Office; Alexandria, Virginia.
International Preliminary Report on Patentability dated Sep. 20, 2022; International Application No. PCT/US2021/022281; The International Bureau of WIPO; Geneva, Switzerland.
Office Action dated Jan. 10, 2023; U.S. Appl. No. 17/249,798; United States Patent and Trademark Office; Alexandria, Virginia.
Dominick Anthony Chir Mulder; Office Action; U.S. Appl. No. 17/249,799, filed Mar. 13, 2023; United States Patent and Trademark Office; Alexandria, Virginia.
Deng Congyao; Office Action; Chinese Application No. 202080060160.9; Feb. 23, 2023; CNIPA; Beijing, China.
Matthew Ho; Office Action; U.S. Appl. No. 17/249,798, filed May 11, 2023; United States Patent and Trademark Office; Alexandria, Virginia.
Simon, Andreas; Related Divisional U.S. Appl. No. 18/522,971 entitled "Adaptive Acceleration for Materials Handling Vehicle", filed Nov. 29, 2023; United States Patent and Trademark Office; Alexandria, Virginia.
Bochao, Li; Office Action No. 1 dated Dec. 19, 2023; Chinese Application No. 202180006985.7; National Intellectual Property Administration; Beijing, China.
Szpaizer, Ana; Official Action dated Sep. 8, 2023; Canadian Application No. 3,163,201; CIPO; Quebec, Canada.
Congyao, Deng; Notice of Allowance dated Sep. 27, 2023: Chinese Application No. 202080060160.9; China National Intellectual Administration; Beijing, China.
Mulder, Dominick Anthony Chir; Notice of Allowance dated Nov. 20, 2023; U.S. Appl. No. 17/249,799; USPTO; Alexandria, Virginia.
Mulder, Dominick Anthony Chir; Final Office Action dated Sep. 12, 2023; U.S. Appl. No. 17/249,799; United States Patent and Trademark Office; Alexandria, Virginia.
Rudy, Andrew J.; Non-Final Office Action dated Dec. 5, 2023; U.S. Appl. No. 17/443,044; United States Patent and Trademark Office; Alexandria, Virginia.
Breton, David; Office Action dated Oct. 27, 2023; Canadian Application No. 3147988; CIPO; Quebec, Canada.
Gardiner, David; Office Action dated Oct. 17, 2023; Canadian Application No. 3161726; CIPO; Quebec, Canada.
Verheul, Omiros; Communication Pursuant to Article 94(3) EPC dated Jan. 23, 2024; European Patent Application No. 20758021.8; European Patent Office; Rijiswijk, Netherlands.
Andreas Simon et al.; Related U.S. continuation U.S. Appl. No. 18/741,989, filed Jun. 13, 2024, entitled "Adaptive Acceleration for Materials Handling Vehicle".
Li, Bochao; Second Chinese Office Action dated Jun. 21, 2024; Chinese Application No. 202180006985.7; China National Intellectual Property Administration, Beijing, China.
Baajour, Shahira; Non-Final Rejection dated Jul. 18, 2024; U.S. Appl. No. 18/522,971; United States Patent and Trademark Office; Alexandria, Virginia.
Lalinde Araguas, Rafael; Communication pursuant to Article 94(3) EPC dated Nov. 8, 2024; European Application No. 21715460.8 European Patent Office; Munich, Germany.
Rudy, Andrew J; Notice of Allowance and Fees Due dated Apr. 9, 2024; U.S. Appl. No. 17/443,044; United States Patent and Trademark Office; Alexandria, Virginia.
Lalinde Araguas, Rafael; Communication Pursuant to Article 94(3) EPC dated Mar. 4, 2024; European Application No. 21715460.8; European Patent Office; Munich, Germany.
Andreas Simon et al.; U.S. Appl. No. 18/935,799 entitled "Adaptive Acceleration for Semi-Automated Driving Operation of a Materials Handling Vehicle"; filed Nov. 4, 2024; United States Patent and Trademark Office; Alexandria, Virginia.
Verheul, Omiros; Extended European Search Report dated Nov. 28, 2024; European Application No. 24196012.9; European Patent Office; Munich, Germany.
Bochao, Li; Chinese Procedure Notice with Notice to Grant dated Dec. 18, 2024; Chinese Application No. 202180006985.7; China National Intellectual Property Administration; Beijing, China.
Wang, Wei; Notification of the First Office Action dated Dec. 5, 2024; Chinese Application No. 202180006826.7; China National Intellectual Property Administration; Beijing, China.
Breton, Antoine; Requisition By the Examiner dated Dec. 17, 2024; Canadian Application No. 3,147,988; Canadian Intellectual Property Office; Quebec, Canada.

\* cited by examiner

| Time increment | Acceleration values manual mode $a_x$ in (m/s²) | Time increment | Acceleration values manual mode $a_x$ in (m/s²) | Time increment | Acceleration values manual mode $a_x$ in (m/s²) |
| --- | --- | --- | --- | --- | --- |
| 1 | 1 | 10 | 0 | 19 | 6 |
| 2 | 2 | 11 | 5 | 20 | 6 |
| 3 | 4 | 12 | 4 | 21 | 1 |
| 4 | 8 | 13 | 2 | 22 | 2 |
| 5 | 3 | 14 | 1 | 23 | 5 |
| 6 | 2 | 15 | 1 | 24 | 5 |
| 7 | 1 | 16 | 3 | 25 | 3 |
| 8 | 0 | 17 | 4 | 26 | 2 |
| 9 | 0 | 18 | 5 | 27 | 1 |

Table 1

FIG. 5

| (Weighted) average | wa$_{x-1}$ start value | wa$_{x-2}$ | wa$_{x-3}$ | wa$_{x-4}$ | wa$_{x-5}$ | wa$_{x-6}$ | wa$_{x-7}$ | wa$_{x-8}$ | wa$_{x-9}$ |
|---|---|---|---|---|---|---|---|---|---|
| Result [m/s$^2$] | 2.33 | 3.33 | 1.83 | 2.42 | 1.87 | 2.94 | 3.64 | 3.82 | 2.91 |

Table 2

| Acceleration y-direction | a$_{y-1}$ | a$_{y-2}$ | a$_{y-3}$ | a$_{y-4}$ | a$_{y-5}$ | a$_{y-6}$ | a$_{y-7}$ | a$_{y-8}$ | a$_{y-9}$ |
|---|---|---|---|---|---|---|---|---|---|
| Result [m/s$^2$] | 0.25 | 0.49 | 0.52 | 0.54 | 0.75 | 0.72 | 0.60 | 0.39 | 0 |

Table 3

| (Weighted) average | wa$_{y-1}$ start value | wa$_{y-2}$ | wa$_{y-3}$ |
|---|---|---|---|
| Result [m/s$^2$] | 0.42 | 0.55 | 0.44 |

Table 4

| Categorization ranges for filtered, max. acceleration in y-direction [m/s$^2$] | Rating | Correction factor corr$_y$ |
|---|---|---|
| 0.50 - 0.75 | High acceleration | +10% |
| 0.25 - 0.50 | Medium acceleration | 0% - no correction |
| 0.00 - 0.25 | Low acceleration | -10% |

Lookup Table

ADAPTIVE ACCELERATION FOR MATERIALS HANDLING VEHICLE

RELATED APPLICATIONS

This application claims the benefit of U.S. Provisional Patent Application No. 62/892,213, filed Aug. 27, 2019, entitled "ADAPTIVE ACCELERATION FOR MATERIALS HANDLING VEHICLE," which is herein incorporated by reference in its entirety. This application further claims the benefit of U.S. Provisional Patent Application No. 62/991,206, filed Mar. 18, 2020, entitled "ADAPTIVE ACCELERATION FOR MATERIALS HANDLING VEHICLE," which is herein incorporated by reference in its entirety. This application still further claims the benefit of U.S. Provisional Patent Application No. 62/991,217, filed Mar. 18, 2020, entitled "BASED ON DETECTED START OF PICKING OPERATION, RESETTING STORED DATA RELATED TO MONITORED DRIVE PARAMETER," which is herein incorporated by reference in its entirety.

BACKGROUND OF THE INVENTION

Materials handling vehicles are commonly used for picking stock in warehouses and distribution centers. Such vehicles typically include a power unit and a load handling assembly, which may include load carrying forks. The vehicle also has control structures for controlling operation and movement of the vehicle.

In a typical stock picking operation, an operator fills orders from available stock items that are located in storage areas provided along one or more aisles of a warehouse or distribution center. The operator drives the vehicle between various pick locations where item(s) are to be picked. The operator may drive the vehicle either by using the control structures on the vehicle, or via a wireless remote control device that is associated with the vehicle, such as the remote control device disclosed in commonly owned U.S. Pat. No. 9,082,293, the entire disclosure of which is hereby incorporated by reference herein.

BRIEF SUMMARY OF THE INVENTION

In accordance with a first aspect of the present invention, a method is provided for operating a materials handling vehicle comprising: monitoring, by a controller, a first vehicle drive parameter corresponding to a first direction of travel of the vehicle during a first manual operation of the vehicle by an operator; concurrently monitoring, by the controller, a second vehicle drive parameter corresponding to a second direction different from the first direction of travel during the first manual operation of the vehicle by an operator; receiving, by the controller after the first manual operation of the vehicle, a request to implement a first semi-automated driving operation; and based on the first and second monitored vehicle drive parameters during the first manual operation, controlling, by the controller, implementation of the first semi-automated driving operation.

The first vehicle drive parameter may comprise acceleration in the first direction and the second vehicle drive parameter may comprise acceleration in the second direction.

The first and second directions may be substantially orthogonal to each other.

The method may further comprise: calculating a first value indicative of acceleration in the first direction; calculating a second value indicative of acceleration in the second direction; and modifying the first value based on the second value if the second value falls outside of a predefined mid-range. Based on the modified value, implementation of the first semi-automated driving operation may be controlled by the controller.

Controlling implementation of the first semi-automated driving operation may comprise limiting a maximum acceleration of the vehicle.

In accordance with a second aspect of the present invention, a method is provided for operating a materials handling vehicle comprising: monitoring, by a controller, a vehicle drive parameter during a most recent manual operation of the vehicle by an operator; replacing, by the controller, any stored first data regarding the monitored vehicle drive parameter associated with a previous manual operation of the vehicle by the operator with second data regarding the monitored vehicle drive parameter during the most recent manual operation of the vehicle, the second data not being based on the first data; receiving, by the controller, a request to implement a semi-automated driving operation; and based on the second data regarding the monitored vehicle drive parameter corresponding to the most recent manual operation, controlling by the controller, implementation of the semi-automated driving operation.

The second data may comprise sequential individual values associated with the vehicle drive parameter.

The individual values may be grouped into a plurality of subsets of values, each subset comprising a same predetermined number of adjacent individual values; and for each of the plurality of subsets, calculating a respective arithmetic or weighted average associated with that subset based at least in part on the individual values in that subset.

The method may further comprise: selecting a particular one of the respective arithmetic or weighted averages; and based on the particular one of the arithmetic or weighted averages, controlling by the controller, implementation of the semi-automated driving operation.

Wherein controlling implementation of the semi-automated driving operation may comprise limiting a maximum acceleration of the vehicle.

The particular one weighted average may comprise a maximum of the respective arithmetic or weighted averages.

In accordance with a third aspect of the present invention, a system is provided for operating a materials handling vehicle comprising: a memory storing executable instructions; a processor in communication with the memory, the processor when executing the executable instructions: monitors a first vehicle drive parameter corresponding to a first direction of travel of the vehicle during a first manual operation of the vehicle by an operator; concurrently monitors a second vehicle drive parameter corresponding to a second direction different from the first direction of travel during the first manual operation of the vehicle by an operator; receives, after the first manual operation of the vehicle, a request to implement a first semi-automated driving operation; and controls implementation of the first semi-automated driving operation based on the first and second monitored vehicle drive parameters during the first manual operation.

The first vehicle drive parameter may comprise acceleration in the first direction and the second vehicle drive parameter may comprise acceleration in the second direction.

The first and second directions may be substantially orthogonal to each other.

The processor when executing the executable instructions: may calculate a first value indicative of acceleration in the first direction; may calculate a second value indicative of acceleration in the second direction; and may modify the first value based on the second value if the second value falls outside of a predefined mid-range.

The processor when executing the executable instructions: may control implementation of the first semi-automated driving operation based on the modified value.

Controlling implementation of the first semi-automated driving operation may comprise limiting a maximum acceleration of the vehicle.

In accordance with a fourth aspect of the present invention, a system is provided for operating a materials handling vehicle comprising: a memory storing executable instructions; a processor in communication with the memory, the processor when executing the executable instructions: monitors a vehicle drive parameter during a most recent manual operation of the vehicle by an operator; replaces any stored first data regarding the monitored vehicle drive parameter associated with a previous manual operation of the vehicle by the operator with second data regarding the monitored vehicle drive parameter during the most recent manual operation of the vehicle, the second data not being based on the first data; receives a request to implement a semi-automated driving operation; and controls implementation of the semi-automated driving operation based on the second data regarding the monitored vehicle drive parameter corresponding to the most recent manual operation.

The second data may comprise sequential individual values associated with the vehicle drive parameter.

The processor when executing the executable instructions: may group the individual values into a plurality of subsets of values, each subset comprising a same predetermined number of adjacent individual values; and for each of the plurality of subsets, may calculate a respective arithmetic or weighted average associated with that subset based at least in part on the individual values in that subset.

The processor when executing the executable instructions: may select a particular one of the respective arithmetic or weighted averages; and may control implementation of the semi-automated driving operation based on the particular one of the arithmetic or weighted averages.

Controlling implementation of the semi-automated driving operation may comprise limiting a maximum acceleration of the vehicle.

The particular one arithmetic or weighted average may comprise a maximum of the respective arithmetic or weighted averages.

BRIEF DESCRIPTION OF THE SEVERAL VIEWS OF THE DRAWINGS

FIG. 5 illustrates a table containing non-real sample acceleration values in the first direction corresponding to a most recent manual operation of the vehicle;

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Low Level Order Picking Truck

Figure 1:
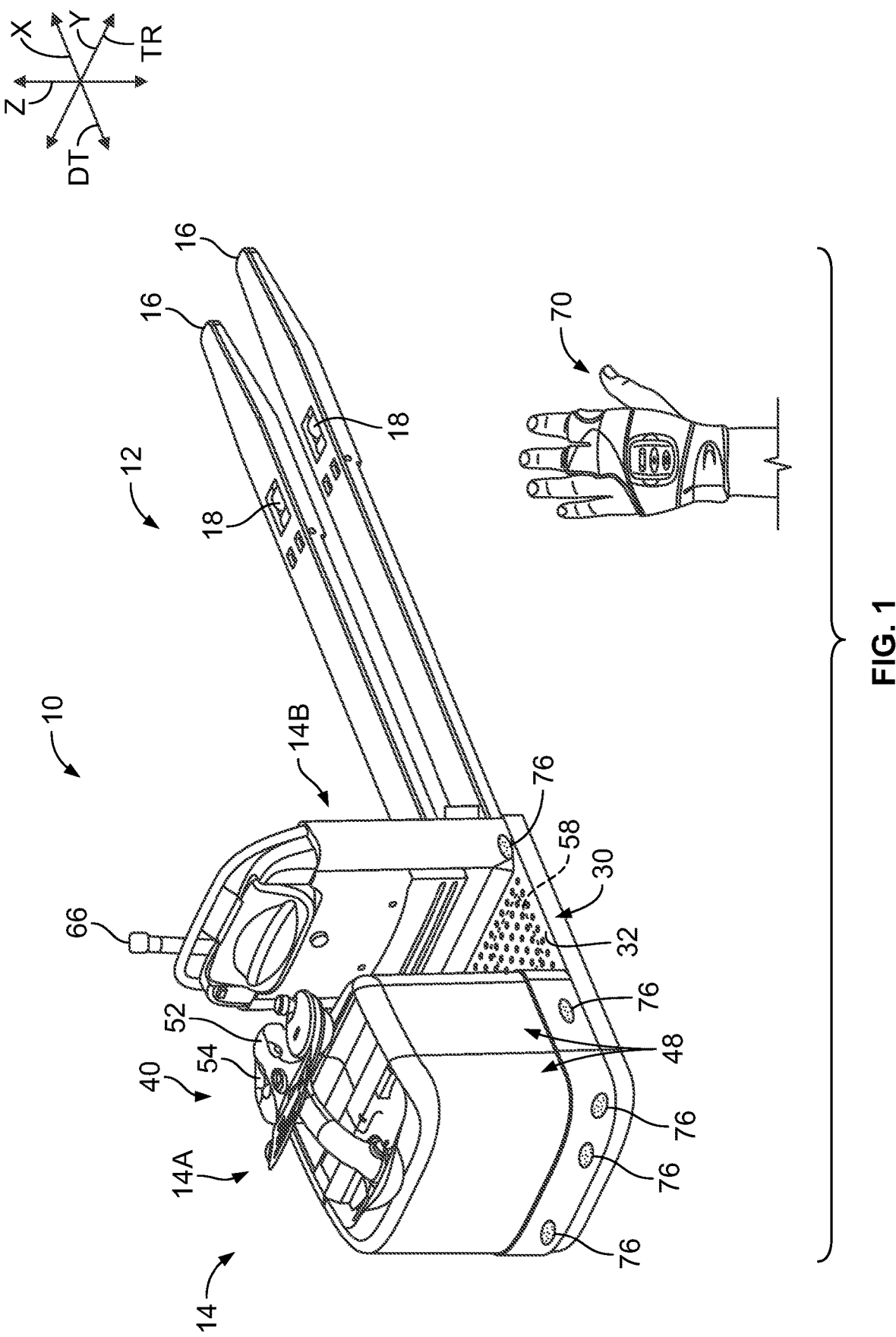
FIG. 1 is an illustration of a materials handling vehicle capable of remote wireless operation according to various aspects of the present invention.

Referring now to the drawings, and particularly to FIG. 1, a materials handling vehicle, which is illustrated as a low level order picking truck 10, includes in general a load handling assembly 12 that extends from a power unit 14. The load handling assembly 12 includes a pair of forks 16, each fork 16 having a load supporting wheel assembly 18. The load handling assembly 12 may include other load handling features in addition to, or in lieu of the illustrated arrangement of the forks 16, such as a load backrest, scissors-type elevating forks, outriggers or separate height adjustable forks. Still further, the load handling assembly 12 may include load handling features such as a mast, a load platform, collection cage or other support structure carried by the forks 16 or otherwise provided for handling a load supported and carried by the truck 10 or pushed or pulled by the truck, i.e., such as by a tugger vehicle.

The illustrated power unit 14 comprises a step-through operator's station 30 dividing a first end section 14A of the power unit 14 (opposite the forks 16) from a second end section 14B (proximate the forks 16). The step-through operator's station 30 provides a platform 32 upon which an operator may stand to drive the truck 10 and/or to provide a position from which the operator may operate the various included features of the truck 10.

A first work area is provided towards the first end section 14A of the power unit 14 and includes a control area 40 for driving the truck 10 when the operator is standing on the platform 32 and for controlling the features of the load handling assembly 12. The first end section 14A defines a compartment 48 for containing a battery, control electronics, including a controller 103 (see FIG. 2), and motor(s), such as a traction motor, steer motor and lift motor for the forks (not shown).

As shown for purposes of illustration, and not by way of limitation, the control area 40 comprises a handle 52 for steering the truck 10, which may include controls such as grips, butterfly switches, thumbwheels, rocker switches, a hand wheel, a steering tiller, etc., for controlling the acceleration/braking and travel direction of the truck 10. For example, as shown, a control such as a switch grip 54 may be provided on the handle 52, which is spring biased to a center neutral position. Rotating the switch grip 54 forward and upward will cause the truck 10 to move forward, e.g., power unit first, at an acceleration proportional to the amount of rotation of the switch grip 54 until the truck 10 reaches a predefined maximum speed, at which point the truck 10 is no longer permitted to accelerate to a higher speed. For example, if the switch grip 54 is very quickly rotated 50% of a maximum angle of rotation capable for the grip 54, the truck 10 will accelerate at approximately 50% of the maximum acceleration capable for the truck until the truck reaches 50% of the maximum speed capable for the truck. It is also contemplated that acceleration may be determined using an acceleration map stored in memory where the rotation angle of the grip 54 is used as an input into and has a corresponding acceleration value in the acceleration map. The acceleration values in the acceleration map corresponding to the grip rotation angles may be proportional to the grip rotation angles or vary in any desired manner. There may also be a velocity map stored in memory where the rotation angle of the grip 54 is used as an input into and has a corresponding maximum velocity value stored in the velocity map. For example, when the grip 54 is rotated 50% of the maximum angle capable for the grip 54, the truck will accelerate at a corresponding acceleration value stored in the acceleration map to a maximum velocity value stored in the velocity map corresponding to the grip angle of 50% of the maximum angle. Similarly, rotating the switch grip 54 toward the rear and downward of the truck 10 will cause the truck 10 to move in reverse, e.g., forks first, at an acceleration proportional to the amount of rotation of the switch grip 54 until the truck 10 reaches a predefined maximum speed, at which point the truck 10 is no longer permitted to accelerate to a higher speed.

Presence sensors 58 may be provided to detect the presence of an operator on the truck 10. For example, presence sensors 58 may be located on, above or under the platform floor, or otherwise provided about the operator's station 30. In the exemplary truck 10 of FIG. 1, the presence sensors 58 are shown in dashed lines indicating that they are positioned under the platform floor. Under this arrangement, the presence sensors 58 may comprise load sensors, switches, etc. As an alternative, the presence sensors 58 may be implemented above the platform floor, such as by using ultrasonic, capacitive or other suitable sensing technology. The utilization of presence sensors 58 will be described in greater detail herein.

An antenna 66 extends vertically from the power unit 14 and is provided for receiving control signals from a corresponding wireless remote control device 70. It is also contemplated that the antenna 66 may be provided within the compartment 48 of the power unit 14 or elsewhere on the truck 10. The remote control device 70 may comprise a transmitter that is worn or otherwise maintained by the operator. The remote control device 70 is manually operable by an operator, e.g., by pressing a button or other control, to cause the remote control device 70 to wirelessly transmit at least a first type of signal designating a travel request to the truck 10. The travel request is a command that requests the corresponding truck 10 to travel by a predetermined amount, as will be described in greater detail herein.

The truck 10 also comprises one or more obstacle sensors 76, which are provided about the truck 10, e.g., towards the first end section of the power unit 14 and/or to the sides of the power unit 14. The obstacle sensors 76 include at least one contactless obstacle sensor on the truck 10, and are operable to define at least one detection zone. For example, at least one detection zone may define an area at least partially in front of a forward traveling direction of the truck 10 when the truck 10 is traveling in response to a wirelessly received travel request from the remote control device 70.

The obstacle sensors 76 may comprise any suitable proximity detection technology, such as ultrasonic sensors, optical recognition devices, infrared sensors, laser scanner sensors, etc., which are capable of detecting the presence of objects/obstacles or are capable of generating signals that can be analyzed to detect the presence of objects/obstacles within the predefined detection zone(s) of the power unit 14.

In practice, the truck 10 may be implemented in other formats, styles and features, such as an end control pallet truck that includes a steering tiller arm that is coupled to a tiller handle for steering the truck. Similarly, although the remote control device 70 is illustrated as a glove-like structure 70, numerous implementations of the remote control device 70 may be implemented, including for example, finger worn, lanyard or sash mounted, etc. Still further, the truck, remote control system and/or components thereof, including the remote control device 70, may comprise any additional and/or alternative features or implementations, examples of which are disclosed in any one or more of the following commonly owned patents/published patent applications: U.S. Provisional Patent Application Ser. No. 60/825,688, filed Sep. 14, 2006 entitled "SYSTEMS AND METHODS OF REMOTELY CONTROLLING A MATERIALS HANDLING VEHICLE;" U.S. patent application Ser. No. 11/855,310, filed Sep. 14, 2007 entitled "SYSTEMS AND METHODS OF REMOTELY CONTROLLING A MATERIALS HANDLING VEHICLE;" U.S. patent application Ser. No. 11/855,324, filed Sep. 14, 2007 entitled "SYSTEMS AND METHODS OF REMOTELY CONTROLLING A MATERIALS HANDLING VEHICLE;" U.S. Provisional Patent Application Ser. No. 61/222,632, filed Jul. 2, 2009, entitled "APPARATUS FOR REMOTELY CONTROLLING A MATERIALS HANDLING VEHICLE;" U.S. patent application Ser. No. 12/631,007, filed Dec. 4, 2009, entitled "MULTIPLE ZONE SENSING FOR MATERIALS HANDLING VEHICLES;" U.S. Provisional Patent Application Ser. No. 61/119,952, filed Dec. 4, 2008, entitled "MULTIPLE ZONE SENSING FOR REMOTELY CONTROLLED MATERIALS HANDLING VEHICLES;" and/or U.S. Pat. No. 7,017,689, issued Mar. 28, 2006, entitled "ELECTRICAL STEERING ASSIST FOR MATERIAL HANDLING VEHICLE;" the entire disclosures of which are each hereby incorporated by reference herein.

Control System for Remote Operation of a Low Level Order Picking Truck

Figure 2:
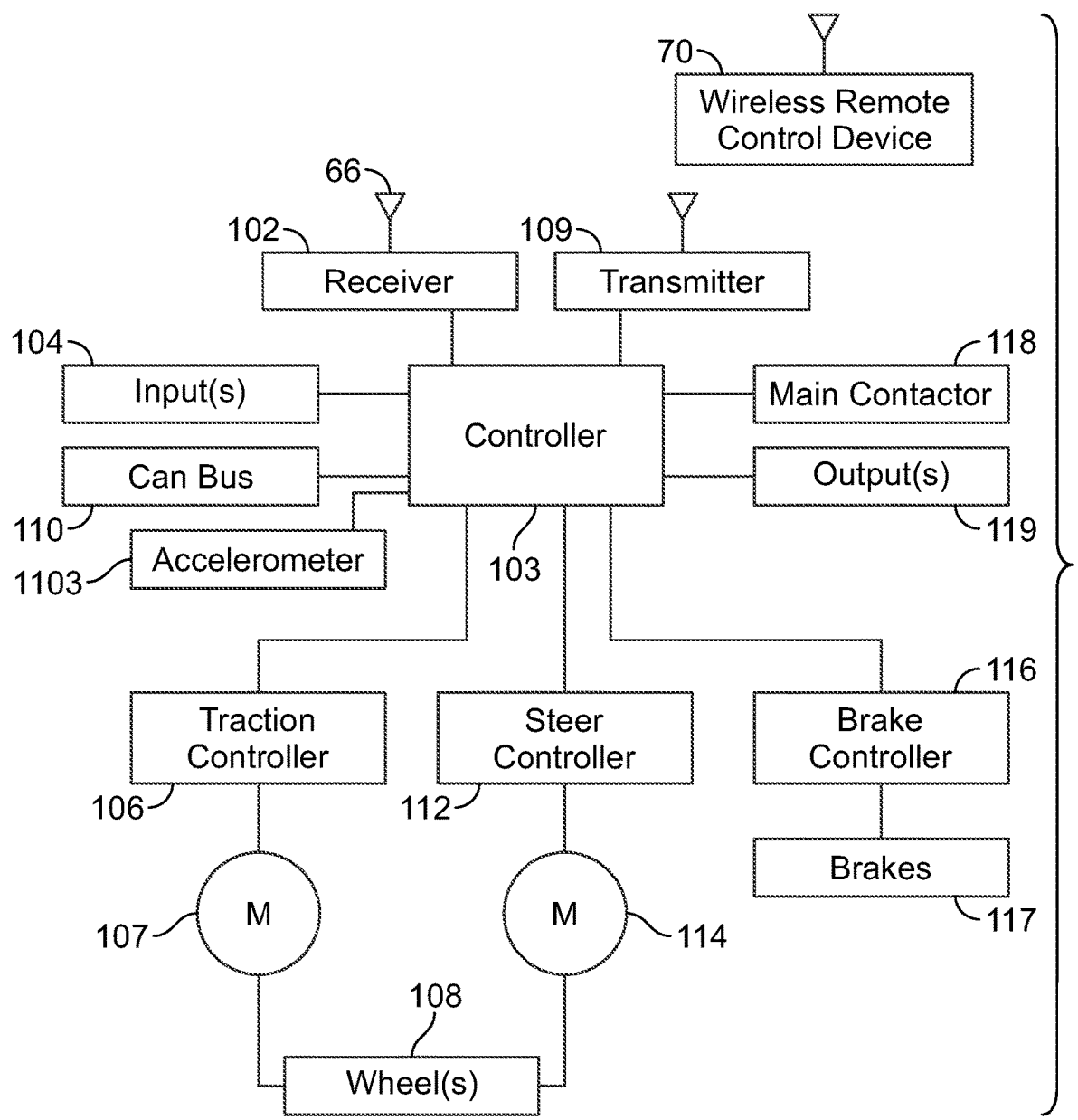
FIG. 2 is a schematic diagram of several components of a materials handling vehicle capable of remote wireless operation according to various aspects of the present invention.

Referring to FIG. 2, a block diagram illustrates a control arrangement for integrating remote control commands with the truck 10. The antenna 66 is coupled to a receiver 102 for receiving commands issued by the remote control device 70. The receiver 102 passes the received control signals to the controller 103, which implements the appropriate response to the received commands and may thus also be referred to herein as a master controller. In this regard, the controller 103 is implemented in hardware and may also execute software (including firmware, resident software, microcode, etc.). Furthermore, aspects of the present invention may take the form of a computer program product embodied in one or more computer readable medium(s) having computer readable program code embodied thereon.

Thus, the controller 103 may comprise an electronic controller defining, at least in part, a data processing system suitable for storing and/or executing program code and may include at least one processor coupled directly or indirectly to memory elements, e.g., through a system bus or other suitable connection. The memory elements can include local memory employed during actual execution of the program code, memory that is integrated into a microcontroller or application specific integrated circuit (ASIC), a programmable gate array or other reconfigurable processing device, etc. The at least one processor may include any processing component operable to receive and execute executable instructions (such as program code from one or more memory elements). The at least one processor may comprise any kind of a device which receives input data, processes that data through computer instructions, and generates output data. Such a processor can be a microcontroller, a hand-held device, laptop or notebook computer, desktop computer, microcomputer, digital signal processor (DSP), mainframe, server, cell phone, personal digital assistant, other programmable computer devices, or any combination thereof. Such processors can also be implemented using programmable logic devices such as field programmable gate arrays (FPGAs) or, alternatively, realized as application specific integrated circuits (ASICs) or similar devices. The term "processor" is also intended to encompass a combination of two or more of the above recited devices, e.g., two or more microcontrollers.

The response implemented by the controller 103 in response to wirelessly received commands, e.g., via the wireless transmitter 70 and corresponding antennae 66 and receiver 102, may comprise one or more actions, or inactions, depending upon the logic that is being implemented. Positive actions may comprise controlling, adjusting or otherwise affecting one or more components of the truck 10. The controller 103 may also receive information from other inputs 104, e.g., from sources such as the presence sensors 58, the obstacle sensors 76, switches, load sensors, encoders and other devices/features available to the truck 10 to determine appropriate action in response to the received commands from the remote control device 70. The sensors 58, 76, etc. may be coupled to the controller 103 via the inputs 104 or via a suitable truck network, such as a control area network (CAN) bus 110.

In one embodiment, the controller 103 may comprise an accelerometer which may measure physical acceleration of the truck 10 along three axes. It is also contemplated that the accelerometer 1103 may be separate from the controller 103 but coupled to and in communication with the controller 103 for generating and transmitting to the controller 103 acceleration signals, see FIG. 2. For example, the accelerometer 1103 may measure the acceleration of the truck 10 in a direction of travel DT (also referred to herein as a first direction of travel) of the truck 10, which, in the FIG. 1 embodiment, is collinear with an axis X. The direction of travel DT or first direction of travel may be defined as the direction in which the truck 10 is moving, either in a forward or power unit first direction or a reverse or forks first direction. The accelerometer 1103 may further measure the acceleration of the truck 10 along a transverse direction TR (also referred to herein as a second direction) generally 90 degrees to the direction of travel DT of the truck 10, which transverse direction TR, in the FIG. 1 embodiment, is collinear with an axis Y. The accelerometer 1103 may also measure the acceleration of the truck 10 in a further direction transverse to both the direction of travel DT and the transverse direction TR, which further direction is generally collinear with a Z axis.

In an exemplary arrangement, the remote control device 70 is operative to wirelessly transmit a control signal that represents a first type signal such as a travel command to the receiver 102 on the truck 10. The travel command is also referred to herein as a "travel signal", "travel request" or "go signal". The travel request is used to initiate a request to the truck 10 to travel by a predetermined amount, e.g., to cause the truck 10 to advance or jog, typically only in the power unit first direction, by a limited travel distance. The limited travel distance may be defined by an approximate travel distance, travel time or other measure. In one implementation, the truck may be driven continuously as long as an operator provides a travel request not lasting longer than a predetermined time amount, e.g., 20 seconds. After the operator no longer provides a travel request or if the travel request has been provided for more than the predetermined time period, a traction motor effecting truck movement is no longer activated and the truck is permitted to coast to a stop. The truck 10 may be controlled to travel in a generally straight direction or along a previously determined heading.

Thus, a first type signal received by the receiver 102 is communicated to the controller 103. If the controller 103 determines that the travel signal is a valid travel signal and that the current vehicle conditions are appropriate (explained in greater detail below), the controller 103 sends a signal to the appropriate control configuration of the particular truck 10 to advance and then stop the truck 10. Stopping the truck 10 may be implemented, for example, by either allowing the truck 10 to coast to a stop or by initiating a brake operation to cause the truck 10 to brake to a stop.

As an example, the controller 103 may be communicably coupled to a traction control system, illustrated as a traction motor controller 106 of the truck 10. The traction motor controller 106 is coupled to a traction motor 107 that drives at least one driven wheel 108 of the truck 10. The controller 103 may communicate with the traction motor controller 106 so as to accelerate, decelerate, adjust and/or otherwise limit the speed of the truck 10 in response to receiving a travel request from the remote control device 70. The controller 103 may also be communicably coupled to a steer controller 112, which is coupled to a steer motor 114 that steers at least one steered wheel 108 of the truck 10. In this regard, the truck 10 may be controlled by the controller 103 to travel an intended path or maintain an intended heading in response to receiving a travel request from the remote control device 70.

As yet another illustrative example, the controller 103 may be communicably coupled to a brake controller 116 that controls truck brakes 117 to decelerate, stop or otherwise control the speed of the truck 10 in response to receiving a travel request from the remote control device 70. Still further, the controller 103 may be communicably coupled to other vehicle features, such as main contactors 118, and/or other outputs 119 associated with the truck 10, where applicable, to implement desired actions in response to implementing remote travel functionality.

According to various aspects of the present invention, the controller 103 may communicate with the receiver 102 and with the traction controller 106 to operate the truck 10 under remote control in response to receiving travel commands from the associated remote control device 70.

Correspondingly, if the truck 10 is moving in response to a command received by remote wireless control, the controller 103 may dynamically alter, control, adjust or otherwise affect the remote control operation, e.g., by stopping the truck 10, changing the steer angle of the truck 10, or taking other actions. Thus, the particular vehicle features, the state/condition of one or more vehicle features, vehicle environment, etc., may influence the manner in which the controller 103 responds to travel requests from the remote control device 70.

The controller 103 may refuse to acknowledge a received travel request depending upon predetermined condition(s), e.g., that relate to environmental or operational factor(s). For example, the controller 103 may disregard an otherwise valid travel request based upon information obtained from one or more of the sensors 58, 76. As an illustration, according to various aspects of the present invention, the controller 103 may optionally consider factors such as whether an operator is on the truck 10 when determining whether to respond to a travel command from the remote control device 70. As noted above, the truck 10 may comprise at least one presence sensor 58 for detecting whether an operator is positioned on the truck 10. In this regard, the controller 103 may be further configured to respond to a travel request to operate the truck 10 under remote control when the presence sensor(s) 58 designate that no operator is on the truck 10. Thus, in this implementation, the truck 10 cannot be operated in response to wireless commands from the transmitter unless the operator is physically off of the truck 10. Similarly, if the object sensors 76 detect that an object, including the operator, is adjacent and/or proximate to the truck 10, the controller 103 may refuse to acknowledge a travel request from the transmitter 70. Thus, in an exemplary implementation, an operator must be located within a limited range of the truck 10, e.g., close enough to the truck 10 to be in wireless communication range (which may be limited to set a maximum distance of the operator from the truck 10). Other arrangements may alternatively be implemented.

Any other number of reasonable conditions, factors, parameters or other considerations may also/alternatively be implemented by the controller 103 to interpret and take action in response to received signals from the transmitter. Other exemplary factors are set out in greater detail in any one or more of the following commonly owned patents/published patent applications: U.S. Provisional Patent Application Ser. No. 60/825,688, entitled "SYSTEMS AND METHODS OF REMOTELY CONTROLLING A MATERIALS HANDLING VEHICLE;" U.S. patent application Ser. No. 11/855,310, entitled "SYSTEMS AND METHODS OF REMOTELY CONTROLLING A MATERIALS HANDLING VEHICLE;" U.S. patent application Ser. No. 11/855,324, entitled "SYSTEMS AND METHODS OF REMOTELY CONTROLLING A MATERIALS HANDLING VEHICLE;" U.S. Provisional Patent Application Ser. No. 61/222,632, entitled "APPARATUS FOR REMOTELY CONTROLLING A MATERIALS HANDLING VEHICLE;" U.S. patent application Ser. No. 12/631,007, entitled "MULTIPLE ZONE SENSING FOR MATERIALS HANDLING VEHICLES;" and U.S. Provisional Patent Application Ser. No. 61/119,952, entitled "MULTIPLE ZONE SENSING FOR REMOTELY CONTROLLED MATERIALS HANDLING VEHICLES;" the disclosures of which are each already incorporated by reference herein.

Upon acknowledgement of a travel request, the controller 103 interacts with the traction motor controller 106, e.g., directly or indirectly, e.g., via a bus such as the CAN bus 110 if utilized, to advance the truck 10 by a limited amount. Depending upon the particular implementation, the controller 103 may interact with the traction motor controller 106 and optionally, the steer controller 112, to advance the truck 10 by a predetermined distance. Alternatively, the controller 103 may interact with the traction motor controller 106 and optionally, the steer controller 112, to advance the truck 10 for a period of time in response to the detection and maintained actuation of a travel control on the remote 70. As yet another illustrative example, the truck 10 may be configured to jog for as long as a travel control signal is received. Still further, the controller 103 may be configured to "time out" and stop the travel of the truck 10 based upon a predetermined event, such as exceeding a predetermined time period or travel distance regardless of the detection of maintained actuation of a corresponding control on the remote control device 70.

The remote control device 70 may also be operative to transmit a second type signal, such as a "stop signal", designating that the truck 10 should brake and/or otherwise come to rest. The second type signal may also be implied, e.g., after implementing a "travel" command, e.g., after the truck 10 has traveled a predetermined distance, traveled for a predetermined time, etc., under remote control in response to the travel command. If the controller 103 determines that a wirelessly received signal is a stop signal, the controller 103 sends a signal to the traction controller 106, the brake controller 116 and/or other truck component to bring the truck 10 to a rest. As an alternative to a stop signal, the second type signal may comprise a "coast signal" or a "controlled deceleration signal" designating that the truck 10 should coast, eventually slowing to rest.

The time that it takes to bring the truck 10 to a complete rest may vary, depending for example, upon the intended application, the environmental conditions, the capabilities of the particular truck 10, the load on the truck 10 and other similar factors. For example, after completing an appropriate jog movement, it may be desirable to allow the truck 10 to "coast" some distance before coming to rest so that the truck 10 stops slowly. This may be achieved by utilizing regenerative braking to slow the truck 10 to a stop. Alternatively, a braking operation may be applied after a predetermined delay time to allow a predetermined range of additional travel to the truck 10 after the initiation of the stop operation. It may also be desirable to bring the truck 10 to a relatively quicker stop, e.g., if an object is detected in the travel path of the truck 10 or if an immediate stop is desired after a successful jog operation. For example, the controller may apply predetermined torque to the braking operation. Under such conditions, the controller 103 may instruct the brake controller 116 to apply the brakes 117 to stop the truck 10.

Calculating Vehicle Drive Parameter(s) for Use
During Remote Control Operation of Vehicle As noted above, an operator may stand on the platform 32 within the operator's station 30 to manually operate the truck 10, i.e., operate the truck in a manual mode. The operator may steer the truck 10 via the handle 52 and, further, may cause the truck 10 to accelerate via rotation of the switch grip 54. As also noted above, rotation of the switch grip 54 forward and upward will cause the truck 10 to move forward, e.g., power unit first, at an acceleration that may be proportional to the amount of rotation of the switch grip 54. Similarly, rotating the switch grip 54 toward the rear and downward of the truck 10 will cause the truck 10 to move in reverse, e.g., forks first, at an acceleration that may be proportional to the amount of rotation of the switch grip 54.

As also noted above, the controller 103 may communicate with the receiver 102 and with the traction controller 106 to operate the truck 10 under remote control in response to receiving travel commands from the associated remote control device 70. The travel request is used to initiate a request to the truck 10 to travel by a predetermined amount, e.g., to cause the truck 10 to advance or jog in the first direction of travel, i.e., in the power unit first direction, by a limited travel distance. Hence, the operator may operate the truck 10 in a remote control mode when the operator is not physically present on the truck but is walking near the truck 10 such as during a picking operation, i.e., when the operator is located off the truck 10 and picking or gathering pick items from warehouse storage areas to be loaded on the truck 10. Operating the truck 10 in the remote control mode is also referred to herein as "semi-automated" operation of the truck 10.

When an operator is using the truck 10, such as during a picking operation within a warehouse, the operator typically uses the truck 10 in both the manual mode and the remote control mode.

Previously, a vehicle controller stored a predefined, fixed vehicle parameter, e.g., a maximum acceleration, to limit the maximum acceleration of the vehicle during operation of the vehicle in the remote control mode. This predefined maximum acceleration limit was sometimes too high, e.g., if the truck was being loaded with a tall stack of articles/packages defining loads that were unstable, and too low if the truck was being loaded with a short stack of articles/packages defining loads that were stable.

In accordance with the present invention, the controller 103 monitors one or more drive parameters during a most recent manual operation of the truck 10, which one or more drive parameters correspond to a driving behavior or trait of an operator of the truck 10. If the one or more drive parameters are high, this may correspond to the operator driving the truck 10 briskly. If the one or more drive parameters are low, this may correspond to the operator driving the truck 10 conservatively or cautiously. Instead of using one or more predefined, fixed drive parameters for vehicle control during remote control operation of the truck 10, the present invention calculates one or more adaptive drive parameters for use by the controller 103 during a next remote control operation of the truck 10 based on the one or more drive parameters monitored during a most recent manual operation of the truck 10. Since the one or more drive parameters calculated for use in the next remote control operation of the truck 10 are based on recent driving behavior of the operator, i.e., the one or more drive parameters monitored during the most recent manual mode operation of the truck 10, it is believed that the present invention more accurately and appropriately defines the one or more drive parameters to be used during a next remote control operation of the truck 10 such that the one or more drive parameters more closely match to the most recent driving behavior of the operator.

Figure 3:
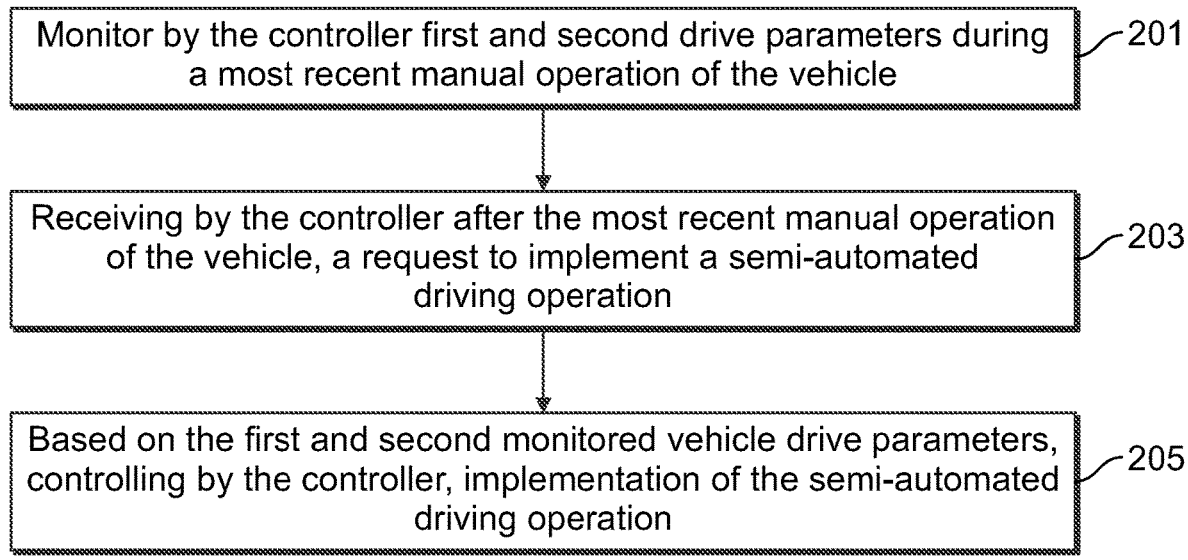
FIG. 3 depicts a flowchart of an example algorithm for monitoring first and second drive parameters during a most recent manual operation of the vehicle and, based on the first and second drive parameters, controlling implementation of a semi-automated driving operation.

An example control algorithm, or process, for the controller 103 is illustrated in FIG. 3 for monitoring first and second drive parameters, e.g., acceleration in first and second directions, during a most recent manual operation of the truck 10 to calculate a corresponding adaptive drive parameter, e.g., a maximum acceleration, to be used by the controller 103 when the truck 10 is next operated in the remote control mode.

In step 201, the controller 103 monitors concurrently during a most recent manual operation of the vehicle, a first drive parameter, e.g., a first acceleration, corresponding to a first direction of travel of the vehicle or truck 10 and a second drive parameter, e.g., a second acceleration, corresponding to a second direction, which is different from the first direction of travel. In the illustrated embodiment, the first direction of travel may be defined by the direction of travel DT of the truck 10, see FIG. 1, and the second direction may be defined by the transverse direction TR. Hence, the first and second directions may be substantially orthogonal to one another. The controller 103 replaces any stored data, i.e., first stored data, regarding the monitored first and second vehicle drive parameters corresponding to the previous manual operation of the vehicle by the operator with recent data, i.e., second data, regarding the monitored first and second vehicle drive parameters during the most recent manual operation of the vehicle, wherein the recent data is not calculated using or based on the previously stored data from the previous manual operation of the vehicle. The vehicle may have been operated in a remote control mode after the previous manual operation of the vehicle and before the most recent manual operation of the vehicle.

An operator may vary acceleration of the truck 10 based on factors such as the curvature of the path along which the truck 10 is being driven, the turning angle of the truck 10, the current floor conditions, e.g., a wet/slippery floor surface or a dry/non-slippery floor surface, and/or the weight and height of any load being carried by the truck 10. For example, if the truck 10 is being driven without a load or with a stable load, e.g., the load has a low height, over a long, straight path, on a dry/non-slippery floor surface, then values for the first acceleration may be high. However, if the truck 10 has an unstable load, e.g., the load has a high height, such that the load may shift or fall from the truck 10 if the truck 10 is accelerated quickly, then values for the first acceleration may be low. Also, if the truck 10 is being turned at a sharp angle and driven at a high speed, then values for the first acceleration may be high and values for the second acceleration may also be high.

In step 203, the controller 103 receives, after the most recent manual operation of the vehicle or truck 10, a request to implement a semi-automated driving operation, i.e., a request to operate the truck 10 in the remote control mode. In the illustrated embodiment and as discussed above, the controller 103 may receive a travel request from the remote control device 70. Such a travel request may define a request to implement a first semi-automated driving operation.

In step 205, the controller 103, based on the first and second monitored vehicle drive parameters during the most recent manual operation of the truck 10, implements the semi-automated driving operation of the truck 10. The controller 103, based on the recent data regarding the monitored first and second vehicle drive parameters during the most recent manual operation of the vehicle, calculates a first value indicative of acceleration of the truck 10 in the first direction and a second value indicative of acceleration of the truck 10 in the second direction. The controller 103 modifies the first value indicative of acceleration in the first direction based on the second value indicative of acceleration in the second direction if the second value falls outside of a pre-defined range. The first value, whether modified or not based on whether the second value falls outside or within the pre-defined range, defines a maximum acceleration that cannot be exceeded during the semi-automated driving operation of the truck 10.

Figure 4:
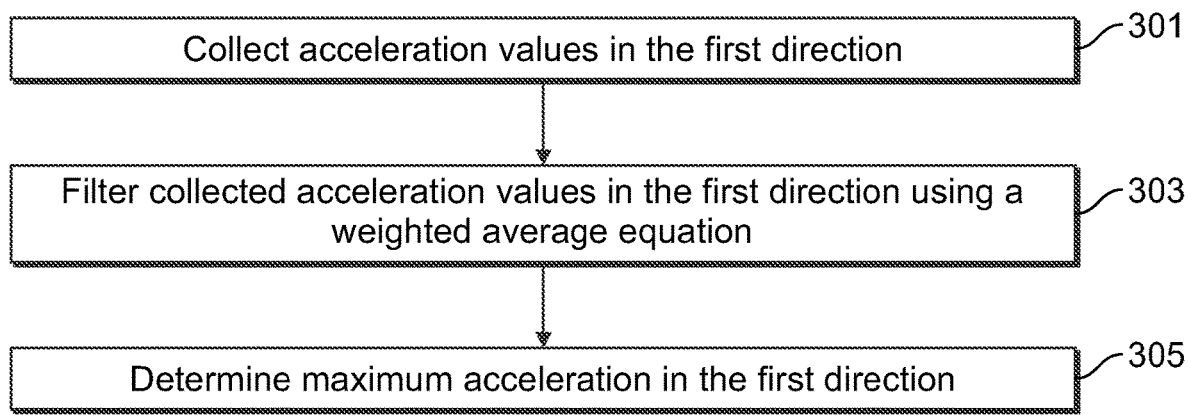
FIG. 4 depicts a flowchart of an example algorithm for calculating a first value indicative of acceleration of the vehicle in a first direction during a most recent manual operation of the vehicle.

An example control algorithm, or process, for the controller 103 is illustrated in FIG. 4 for calculating a first value indicative of acceleration of the truck 10 in the first direction during the most recent manual operation of the truck 10. In step 301, a sequence of positive acceleration values in the first direction from the accelerometer 1103 are collected during the most recent manual operation of the vehicle, wherein the first direction is defined by the direction of travel DT of the truck 10, and stored in memory by the controller 103. Rotation of the switch grip 54 forward and upward will cause the truck 10 to move forward, e.g., power unit first, at a positive acceleration in the power unit first direction proportional to the amount of rotation of the switch grip 54. Similarly, rotating the switch grip 54 toward the rear and downward of the truck 10 will cause the truck 10 to move in reverse, e.g., forks first, at a positive acceleration in the forks first direction proportional to the amount of rotation of the switch grip 54. As the truck 10 accelerates in either the power unit first direction or the forks first direction, both considered the first direction as defined by the direction of travel DT of the truck 10, the accelerometer 1103 generates a sequence of positive acceleration values that are stored in memory by the controller 103. Negative acceleration values, such as occurring during braking, are not collected for use in calculating the first value indicative of acceleration of the truck 10 in the first direction during the most recent manual operation of the vehicle.

In step 303, the acceleration values in the first direction collected during the most recent manual operation of the truck 10 are filtered with a weighted average equation so as to make maximum outliers less weighted and effect smoothing. Example equation 1, set out below, may be used to filter the collected acceleration values in the first direction to calculate weighted average values based on the collected acceleration values in the first direction from the most recent manual operation of the truck 10.

$$wa_{x-(i+1)} = \frac{wa_{x-i} * g_1 + a_{x\_[(i*m)+1]} * g_2 + a_{x\_[(i*m)+2]} * g_3 + a_{x\_[(i*m)+3]} * g_4}{\Sigma g_s}$$ Equation 1

$wa_{x-(i+1)}$=calculated weighted average in a first direction (e.g., "x"); where i=1 . . . (n−1) and n is the total number of subsets into which the individual collected acceleration values, $a_{x\_j}$, are grouped;

$wa_{x-i}$; where i=1 . . . n; $wa_{x-i}$=arithmetic average of the first three "start" acceleration values in the first direction for the first calculation and thereafter the most recent weighted average;

$g_s$=weighting factor where s=1 . . . m+1, where m is the number of members in each subset;

$g_1$=weighting factor of $wa_{x-i}$; in the illustrated embodiment, $g_1$=3, but could be any value;

$g_2$, $g_3$, $g_4$=additional weighting factors=1, but could be any value and is typically less than $g_1$;

$a_{x\_[(i*m)+1]}$, $a_{x\_[(i*m)+2]}$, $a_{x\_[(i*m)+3]}$, where i=1 . . . (n−1); $a_{x\_[(i*m)+1]}$, $a_{x\_[(i*m)+2]}$, $a_{x\_[(i*m)+3]}$=three adjacent individual acceleration values in the first direction, defining a subset, collected during the most recent manual operation of the truck 10. The subset could comprise more than three or less than three acceleration values. The first three collected acceleration values ($a_{x\_1}$, $a_{x\_2}$, and $a_{x\_3}$) make up a first subset as well.

For purposes of illustration, sample calculations will now be provided based on non-real sample values, which simulate collected acceleration values in the first direction, and are set out in Table 1 of FIG. 5.

$wa_{x-1}$ = arithmetic average of the first three "start" acceleration values =

$$\frac{a_{x\_1} + a_{x\_2} + a_{x\_3}}{m} = \frac{1+2+4}{3} = 2.33$$

$wa_{x-2}$ = first weighted average value =

$$\frac{g_1 * wa_{x-1} + g_2 * a_{x\_4} + g_3 * a_{x\_5} + g_4 * a_{x\_6}}{\Sigma g_s} =$$

$$\frac{3*2.33 + 1*8 + 1*3 + 1*2}{6} = 3.33$$

$a_{x-3}$ = second weighted average value =

$$\frac{g_1 * wa_{x-2} + g_2 * a_{x7} + g_3 * a_{x8} + g_4 * a_{x9}}{\Sigma g_s} =$$

$$\frac{3*3.33 + 1*1 + 1*0 + 1*0}{6} = 1.83$$

The remaining weighted average values based on the sample values set out in Table 1 of FIG. 5 are calculated in a similar manner. The results are set out in Table 2 of FIG. 6.

Figures 6, 7, 8:
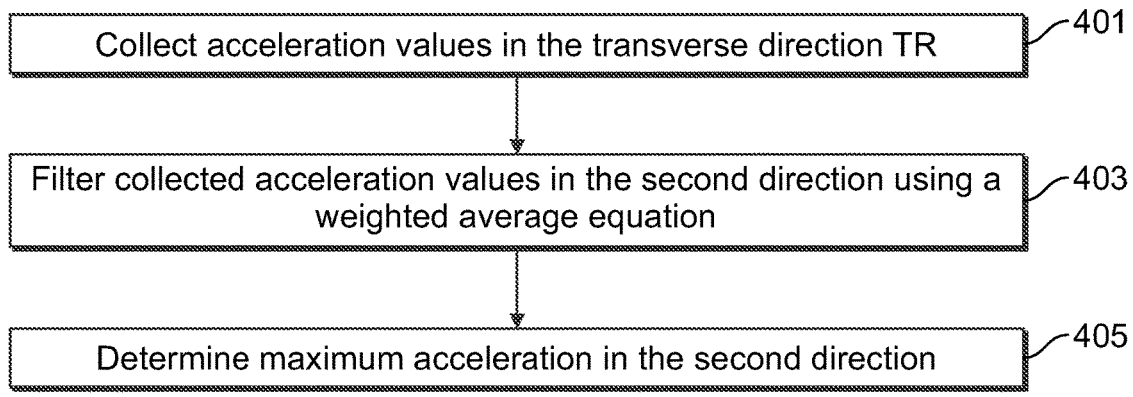
FIG. 6 illustrates a table containing sample values of $wa_{x-i}$.
FIG. 7 depicts a flowchart of an example algorithm for calculating a second value indicative of acceleration of the vehicle in a second direction during a most recent manual operation of the vehicle.
FIG. 8 illustrates a table containing non-real sample acceleration values in the second direction corresponding to a most recent manual operation of the vehicle.

Thus, with respect to Equation 1, the values $a_{x\_[(i*m)+1]}$, $a_{x\_[(i*m)+2]}$, and $a_{x\_[(i*m)+3]}$ are used in the calculation of a weighted average value $wa_{x-(i+1)}$. According to the example of FIG. 5, "i" can range from 1 to 9, but for purposes of Equation 1, "i" ranges from 1 to 8. Accordingly, the 27 acceleration values (i.e., $a_{x\_j}$, "j"=27 individual collected acceleration values in the Example of FIG. 5) in the table of FIG. 5 can be arranged as 9 distinct subsets each having 3 elements. Other than the first subset, which, as noted above, comprise an arithmetic average of the first three "start" acceleration values in the first direction, for each of the subsequent 8 subsets, a weighted average is calculated according to Equation 1. The example initial arithmetic average and the example 8 weighted averages are shown in FIG. 6. One of ordinary skill will readily recognize that the subset size of 3 values is merely an example and that utilizing 9 subsets is an example amount as well.

In step 305 of FIG. 4, a maximum acceleration in the first direction defined by the direction of travel DT of the truck 10 is determined using example Equation 2, set out below:

$a_{x-wa-max}$=maximum acceleration in the first direction=max($wa_{x-i}$)=maximum value of the initial arithmetic and weighted averages ($wa_{x-i}$) calculated.    Equation 2:

Based on the results from Table 2 of FIG. 6, max($wa_{x-i}$)= $a_{x-8}$=3.82.

It is noted that $a_{x-wa-max}$ may be selected from any number of initial arithmetic and weighted average values ($wa_{x-i}$) calculated. For example, the average values ($wa_{x-i}$) calculated during a predetermined time period, e.g., the last ten seconds, may be considered. It is also contemplated that a predetermined number of initial arithmetic and weighted average values ($wa_{x-i}$) calculated, e.g., 25 average values, without taking time into account, may be considered. It is further contemplated that all of the initial arithmetic and weighted average values ($wa_{x-i}$) calculated during the entirety of the most recent manual operation of the truck 10 may be considered. In the illustrated example, nine (9) values of initial arithmetic and weighted averages ($w_{x-i}$) were considered. However, less than 9 or greater than 9 values of initial arithmetic and weighted averages ($wa_{x-i}$) can be considered when selecting max($a_{x-wa-i}$)=maximum value of the initial arithmetic and weighted averages ($wa_{x-i}$) calculated, which defines the $a_{x-wa-max}$=maximum acceleration in the first direction. The maximum acceleration in the first direction ($a_{x-wa-max}$) defines the first value indicative of acceleration of the vehicle in the first direction during the most recent manual operation of the vehicle. Instead of selecting the maximum or highest value from the set of initial arithmetic and weighted average values ($wa_{x-i}$) considered as the maximum acceleration in the first direction $a_{x-wa-max}$, it is contemplated that a second or a third highest value of the initial arithmetic and weighted average values ($wa_{x-i}$) considered may be selected as the maximum acceleration in the first direction $a_{x-wa-max}$. It is further contemplated that the set of initial arithmetic and weighted average values ($wa_{x-i}$) considered may be averaged to determine the maximum acceleration in the first direction $a_{x-wa-max}$.

An example control algorithm, or process, for the controller 103 is illustrated in FIG. 7 for calculating a second value indicative of acceleration of the truck 10 in the second direction during the most recent manual operation of the truck 10. In step 401, a sequence of acceleration values in the second direction from the accelerometer 1103 are collected, wherein the second direction is defined by the transverse direction TR, see FIG. 1, and stored in memory by the controller 103.

In step 403, the collected acceleration values in the second direction collected during the most recent manual operation of the truck 10 are filtered with a weighted average equation so as to make maximum outliers less weighted and effect smoothing. Example equation 3, set out below, may be used to filter the collected acceleration values in the second direction from the most recent manual operation of the truck 10.

$$wa_{y-(i+1)} = \frac{wa_{y-i} * g_1 + a_{y\_[(i*m)+1]} * g_2 + a_{y\_[(i*m)+2]} * g_3 + a_{y\_[(i*m)+3]} * g_4}{\Sigma g_s}$$ Equation 3

$wa_{y-(i+1)}$=calculated weighted average in a second direction (e.g., "y"); where i=1 . . . (n−1);

$wa_{y-i}$; where i=1 . . . n; $wa_{y-i}$=arithmetic average of the first three "start" acceleration values in the second direction for the first calculation and thereafter the most recently calculated weighted average;

$g_s$=weighting factor where s=1 . . . m+1, where m is the number of members in each subset;

$g_1$=weighting factor of $wa_{y-i}$; in the illustrated embodiment, $g_1$=3, but could be any value;

$g_2$, $g_3$, $g_4$=additional weighting factors=1, but could be other values;

$a_{y\_[(i*m)+1]}$, $a_{y\_[(i*m)+2]}$, $a_{y\_[(i*m)+3]}$; where i=1 . . . (n−1);

$a_{y\_[(i*m)+1]}$, $a_{y\_[(i*m)+2]}$, $a_{y\_[(i*m)+3]}$=three adjacent individual acceleration values in the second direction, defining a subset, collected during the most recent manual operation of the truck 10. The subset could comprise more than three or less than three acceleration values. The first three collected acceleration values ($a_{y\_1}$, $a_{y\_2}$, and $a_{y\_3}$) make up a first subset as well.

For purposes of illustration, sample calculations will now be provided based on non-real sample values, which simulate collected acceleration values in the second direction, and are set out in Table 3 of FIG. 8.

$wa_{y-1}$ = arithmetic average of the first three "start" acceleration values in the $$\text{second direction} = \frac{a_{y\_1} + a_{y\_2} + a_{y\_3}}{m} = \frac{0.25 + 0.49 + 0.52}{3} = 0.42$$

$wa_{y-2}$ = first weighted average value =

$$\frac{wa_{y-1} * g_1 + a_{y\_4} * g_2 + a_{y\_5} * g_3 + a_{y\_6} * g_4}{\Sigma g_s} =$$

$$\frac{3*0.42 + 1*0.54 + 1*0.75 + 1*0.72}{6} = 0.55$$

The remaining weighted average value based on the sample values set out in Table 3 of FIG. 8 is calculated in a similar manner. The results are set out in Table 4 of FIG. 9.

Figures 9, 10, 11:
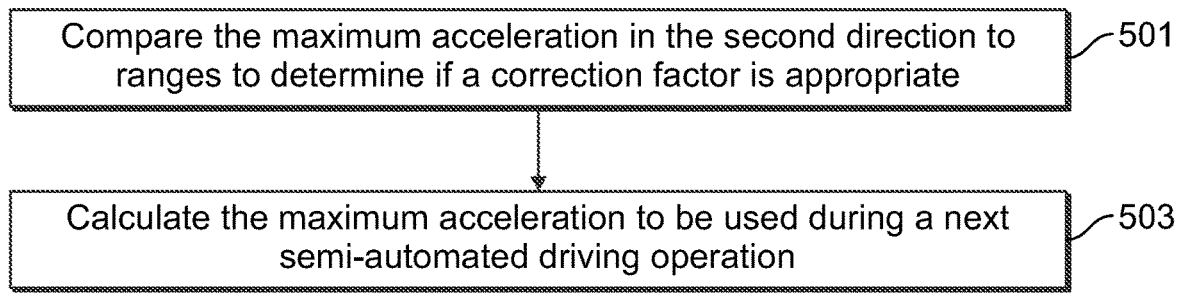
FIG. 9 illustrates a table containing sample values of $a_{y-i}$.
FIG. 10 depicts a flowchart of an example algorithm for calculating a maximum acceleration to be used during a next semi-automated driving operation based on the first and second values indicative of acceleration of the vehicle in the first and second directions during the prior manual operation of the vehicle.
FIG. 11 depicts a lookup table containing three separate ranges for the maximum acceleration in the second direction $(a_{y-max})$.

In step 405 of FIG. 7, a maximum acceleration in the second direction defined by the transverse direction TR of the truck 10 is determined using Equation 4, set out below:

$a_{y-wa-max}$=maximum acceleration in the second direction=max($wa_{y-i}$)=maximum value of the initial arithmetic and weighted averages ($wa_{y-i}$) calculated. Equation 4:

Based on the results from Table 4 of FIG. 9, max($wa_{y-i}$)= $wa_{y-2}$=0.55.

It is noted that $a_{y-wa-max}$ may be selected from the initial arithmetic average or any number of weighted averages ($wa_{y-(i+1)}$) calculated. For example, the initial arithmetic and weighted average values ($wa_{y-i}$) calculated during a predetermined time period, e.g., the last ten seconds, may be considered. It is also contemplated that a predetermined number of the initial arithmetic and weighted average values ($wa_{y-i}$) calculated, e.g., 25 average values, without taking time into account, may be considered. It is further contemplated that all of the initial arithmetic and weighted average values ($wa_{y-i}$) calculated during the entirety of the most recent manual operation of the truck 10 may be considered. In the illustrated example, three (3) values of the initial arithmetic and weighted averages ($wa_{y-i}$) were considered. However, less than 3 or greater than 3 values of the initial arithmetic and weighted averages ($wa_{y-i}$) can be considered when selecting max($wa_{y-i}$)=maximum value of the initial arithmetic and weighted averages ($wa_{y-i}$) calculated, which defines the $a_{y-wa-max}$=maximum acceleration in the second direction. The maximum acceleration of the vehicle in the second direction ($a_{y-wa-max}$) defines the second value indicative of acceleration of the vehicle in the second direction during the most recent manual operation of the vehicle.

An example control algorithm, or process, for the controller 103 is illustrated in FIG. 10 for calculating a maximum acceleration to be used during a next semi-automated driving operation based on the first and second values indicative of acceleration of the truck 10 in the first and second directions during the prior or most recent manual operation of the truck 10. As noted above, the first value indicative of acceleration of the truck 10 in the first direction is defined by the maximum acceleration in the first direction ($a_{x-wa-max}$) and the second value indicative of acceleration of the truck 10 in the second direction is defined by the maximum acceleration in the second direction ($a_{y-wa-max}$). During operation of the truck 10, an operator may drive the truck 10 quickly along a generally straight path, but slowly during a turn. To factor in the operator driving the truck 10 slowly during a turn, in step 501, the controller 103 compares the maximum acceleration in the second direction ($a_{y-wa-max}$) to empirically determined ranges set out in a lookup table stored in memory to determine if a correction to the maximum acceleration in the first direction ($a_{x-wa-max}$) is appropriate.

As explained in detail below, the maximum acceleration in the second direction ($a_{y-wa-max}$) can be used to correct, or adjust, the calculated maximum acceleration in the first direction $a_{x-wa-max}$ when determining the maximum acceleration for the next semi-automated driving operation. The maximum acceleration in the second direction ($a_{y-wa-max}$) is likely indicative of the operator's evaluation of the stability of the truck 10 and its current load. If the maximum acceleration in the second direction is greater than a first empirically derived value or within an empirically derived "high acceleration" range, then that can indicate the operator believes the load is relatively stable and the maximum acceleration for the next semi-automated driving operation can be increased. However, if the maximum acceleration in the second direction is less than a second empirically derived value or falls within an empirically defined "low acceleration" range, then that can indicate the operator believes the load could be unstable even though the calculated maximum acceleration in the first direction is relatively high. Thus, in this second instance, the maximum acceleration for the next semi-automated driving operation can be decreased. If the maximum acceleration in the second direction is in-between the first and the second empirically derived values or within an empirically defined medium range, then no correction, or adjustment, of the maximum acceleration for the next semi-automated driving operation is made. High, low and medium ranges (or empirically derived first and second values) can be empirically determined for a particular vehicle in a controlled environment where the vehicle is operated at various maximum accelerations in the first and second directions, various high, low and medium ranges of differing values are created and, using the maximum acceleration values in the second direction, correction factors are determined and used to adjust the maximum acceleration values in the first direction. Preferred high, low and medium ranges, which allow for an optimum acceleration in the first direction yet allow the truck to carry and support loads in a stable manner are selected.

An exemplary simulated lookup table based on non-real values is set out in FIG. 11, which table contains three separate ranges for the maximum acceleration in the second direction ($a_{y-wa-max}$). If the maximum acceleration in the second direction falls within either the high or the low acceleration range depicted in the lookup table of FIG. 11, a corresponding correction factor is used in determining the maximum acceleration to be used during the next semi-automated driving operation of the truck 10. If the maximum acceleration in the second direction falls within the middle acceleration range (or mid-range) depicted in the lookup table of FIG. 11, no correction factor corresponding to the maximum acceleration in the second direction is used in determining the maximum acceleration for use during the next semi-automated driving operation of the truck 10.

In the example discussed above, the maximum acceleration in the second direction ($a_{y-wa-max}$)=0.55. This value falls within the high acceleration range, which corresponds to a correction factor of +10%.

In step 503, the maximum acceleration to be used during a next semi-automated driving operation (which may also be referred to as "a semi-automated driving operation maximum acceleration") is calculated using example Equation 5:

$$\text{max.acc} = \max(wa_{x-i}) * (1 + \text{corr}_x + \text{corr}_y) \quad \text{Equation 5:}$$

Where max.acc=the maximum acceleration to be used in the first direction during a next semi-automated driving operation;

$\text{corr}_x$=a safety margin, which could be equal to any value. In the illustrated embodiment $\text{corr}_x$=−5% (may comprise a negative value as in the illustrated embodiment to reduce max.acc to provide a safety margin);

$\text{corr}_y$=correction factor from the lookup table in FIG. 11 and is based on the maximum acceleration in the second direction ($a_{y-wa-max}$).

A sample calculation for max.acc based on the sample values discussed above will now be provided.

$$\text{max.acc} = \max(wa_{x-i}) * (1 + \text{corr}_x + \text{corr}_y) = 3.82 * (1 - 0.05 + 0.1) = 4.01$$

Hence, in this example, the controller 103 communicates with the traction motor controller 106 so as to limit the maximum acceleration of the truck 10 in the first direction during a next semi-automated or remote control operation to 4.01 m/s².

It is also contemplated that the controller 103 may calculate a first value indicative of deceleration of the vehicle in the first direction during the most recent manual operation of the vehicle using equations 1 and 2 set out above, wherein the absolute value of each deceleration value collected from the most recent manual operation of the vehicle is used in calculating the first value using equations 1 and 2. Deceleration values corresponding to emergency breaking, which deceleration values may have very high magnitudes, are ignored in calculating the first value indicative of deceleration of the vehicle.

In the event that the truck 10 does not have an accelerometer, acceleration values in the first and second directions can be calculated in alternative manners. For example, acceleration in the direction of travel DT or first direction can be determined using a velocity sensor, wherein a velocity sensor may be provided on a traction motor controller. The controller 103 may differentiate the velocity or speed values to calculate acceleration values. Acceleration may also be derived from the angular position of the switch grip 54 relative to a home position, which grip 54, as noted above, controls the acceleration/braking of the truck 10. Using the angular position of the grip 54 as an input into a lookup table, a truck acceleration is chosen from the lookup table which corresponds specific grip angular position values with specific acceleration values. Maximum velocity values may also be provided by the lookup table based on grip angular positions.

Acceleration in the transverse direction TR or second direction can be determined using the following equation:

$$\text{acceleration}_y = v^2/r$$

where v=truck speed; and
r=radius of a curve through which the truck moves;
The radius r may be calculated using the following equation:

$$r = \text{wheelbase dimension}/\sin \alpha$$

Where the wheelbase dimension is a fixed value and is equal to the distance from the front wheels to the rear wheels of the truck 10; and Steering angle α, which is typically known by the controller 103 as it is the steered wheel angle.

Having thus described the invention of the present application in detail and by reference to embodiments thereof, it will be apparent that modifications and variations are possible without departing from the scope of the invention defined in the appended claims.

What is claimed is:

1. A method for operating a materials handling vehicle comprising:
   monitoring and storing first data regarding a vehicle drive parameter, by a controller, during a previous manual operation of the vehicle by an operator;
   replacing, by the controller, the stored first data, regarding the monitored vehicle drive parameter, associated with the previous manual operation of the vehicle by the operator with second data regarding the monitored vehicle drive parameter monitored and stored during a most recent manual operation of the vehicle, the second data comprises sequential individual values associated with the vehicle drive parameter;
   receiving, by the controller, a request to implement a semi-automated driving operation of the vehicle;
   grouping the sequential individual values into a plurality of subsets of values, each subset comprising a same predetermined number of adjacent individual values;
   for each of the plurality of subsets, calculating a respective arithmetic or weighted average associated with that subset based at least in part on the individual values in that subset such that an arithmetic average and at least one weighted average are calculated;
   selecting a particular one of the arithmetic average and the at least one weighted average; and
   based on the particular one of the arithmetic average and the at least one weighted average, controlling by the controller, implementation of the semi-automated driving operation.

2. The method of claim 1, wherein controlling implementation of the semi-automated driving operation comprises limiting a maximum acceleration of the vehicle.

3. The method of claim 1, wherein the particular one of the arithmetic average and the at least one weighted average comprises a maximum of the arithmetic average and the at least one weighted average.

4. The method of claim 1, wherein the second data is not calculated using or based on the first data.

5. The method of claim 1, wherein the vehicle is operated in another semi-automated driving operation after the previous manual operation and before the most recent manual operation of the vehicle.

6. The method of claim 1, wherein the semi-automated driving operation comprises a remote control operation.

7. A system for operating a materials handling vehicle comprising:
   a memory storing executable instructions;
   a processor in communication with the memory, the processor when executing the executable instructions:
      monitors and stores first data regarding a vehicle drive parameter during a previous manual operation of the vehicle by an operator;
      replaces the stored first data, regarding the monitored vehicle drive parameter, associated with the previous manual operation of the vehicle by the operator with second data regarding the monitored vehicle drive parameter monitored and stored during a most recent manual operation of the vehicle, the second data comprises sequential individual values associated with the vehicle drive parameter;
      receives a request to implement a semi-automated driving operation of the vehicle;
      groups the sequential individual values into a plurality of subsets of values, each subset comprising a same predetermined number of adjacent individual values;
      for each of the plurality of subsets, calculates a respective arithmetic or weighted average associated with that subset based at least in part on the individual values in that subset such that an arithmetic average and at least one weighted average are calculated;
      selects a particular one of the arithmetic average and the at least one weighted average; and
      controls implementation of the semi-automated driving operation based on the particular one of the arithmetic average and the at least one weighted average.

8. The system of claim 7, wherein controlling implementation of the semi-automated driving operation comprises limiting a maximum acceleration of the vehicle.

9. The system of claim 7, wherein the particular one of the arithmetic average and the at least one weighted average comprises a maximum of the respective arithmetic average and the at least one weighted average.

10. The system of claim 7, wherein the second data is not calculated using or based on the first data.

11. The system of claim 7, wherein the vehicle is operated in another semi-automated driving operation after the previous manual operation and before the most recent manual operation of the vehicle.

\* \* \* \* \*